US008803654B2

(12) United States Patent
Kurachi et al.

(10) Patent No.: US 8,803,654 B2
(45) Date of Patent: Aug. 12, 2014

(54) SAFETY APPARATUS AND FAULT DETECTION METHOD

(75) Inventors: Haruyuki Kurachi, Chiyoda-ku (JP); Tatsuaki Kamiya, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 62 days.

(21) Appl. No.: 13/639,295

(22) PCT Filed: Apr. 26, 2010

(86) PCT No.: PCT/JP2010/057385
§ 371 (c)(1),
(2), (4) Date: Oct. 4, 2012

(87) PCT Pub. No.: WO2011/135656
PCT Pub. Date: Nov. 3, 2011

(65) Prior Publication Data
US 2013/0021135 A1    Jan. 24, 2013

(51) Int. Cl.
*G05B 23/02*    (2006.01)
(52) U.S. Cl.
USPC ............................................. 340/3.43
(58) Field of Classification Search
USPC ............. 340/3.43, 3.42, 3.6, 426.13, 426.24, 340/517
See application file for complete search history.

(56) References Cited

U.S. PATENT DOCUMENTS

| 5,499,196 A * | 3/1996 | Pacheco ...................... 702/81 |
| 2005/0010332 A1 | 1/2005 | Abe et al. |
| 2006/0277907 A1 | 12/2006 | Ueda et al. |
| 2006/0287806 A1 | 12/2006 | Hori |
| 2009/0024230 A1 | 1/2009 | Hioka et al. |

FOREIGN PATENT DOCUMENTS

| JP | 04-123141 A1 | 4/1992 |
| JP | 2005-031778 A | 2/2005 |
| JP | 2005-326988 A | 11/2005 |
| JP | 2006-348778 A | 12/2006 |
| JP | 2006-350707 A | 12/2006 |
| JP | 2008-310478 A | 12/2008 |
| JP | 2008-310534 A | 12/2008 |
| JP | 2009-217389 A | 9/2009 |

\* cited by examiner

*Primary Examiner* — Vernal Brown
(74) *Attorney, Agent, or Firm* — Sughrue Mion, PLLC

(57) ABSTRACT

A safety apparatus includes: a latch circuit which retains an inconsistent state record when input signals from a plurality of sensors are in an inconsistent state, and frees the inconsistent state record when the input signals from the plurality of sensors are all in an OFF state; and an AND circuit which performs a sensor fault determination at timing when the input signals from the plurality of sensors are all in an ON state, the sensor fault determination including determining that at least one of the plurality of sensors is failed if the latch circuit retains the inconsistent state record and determining that none of the plurality of the sensors is failed if the latch circuit retains no inconsistent state record.

10 Claims, 15 Drawing Sheets

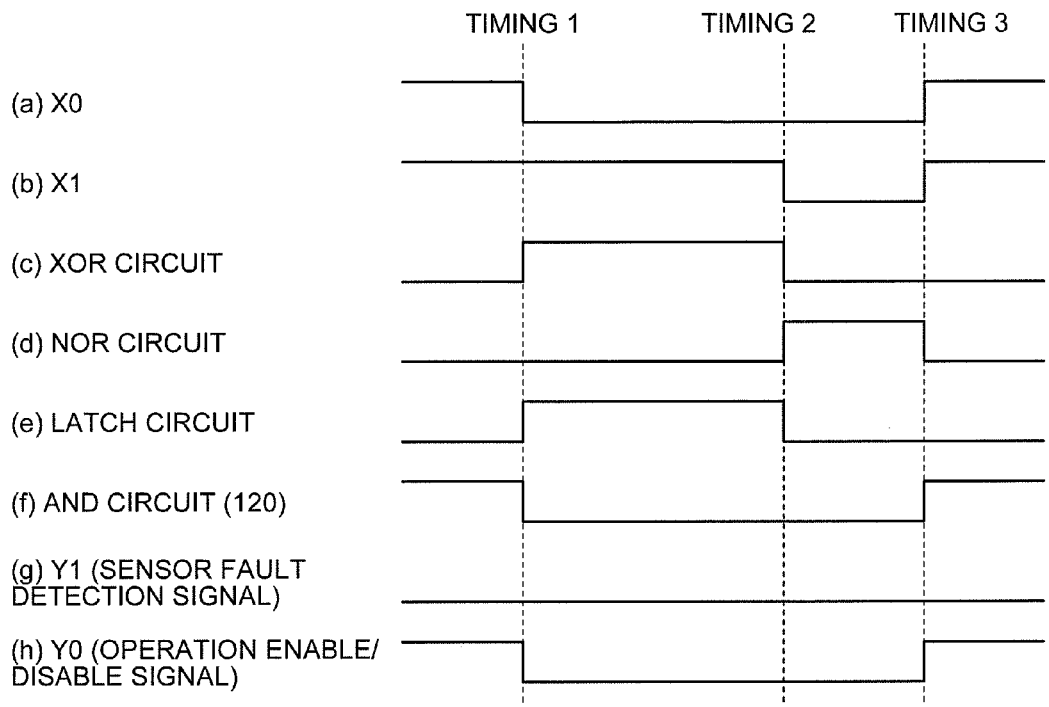
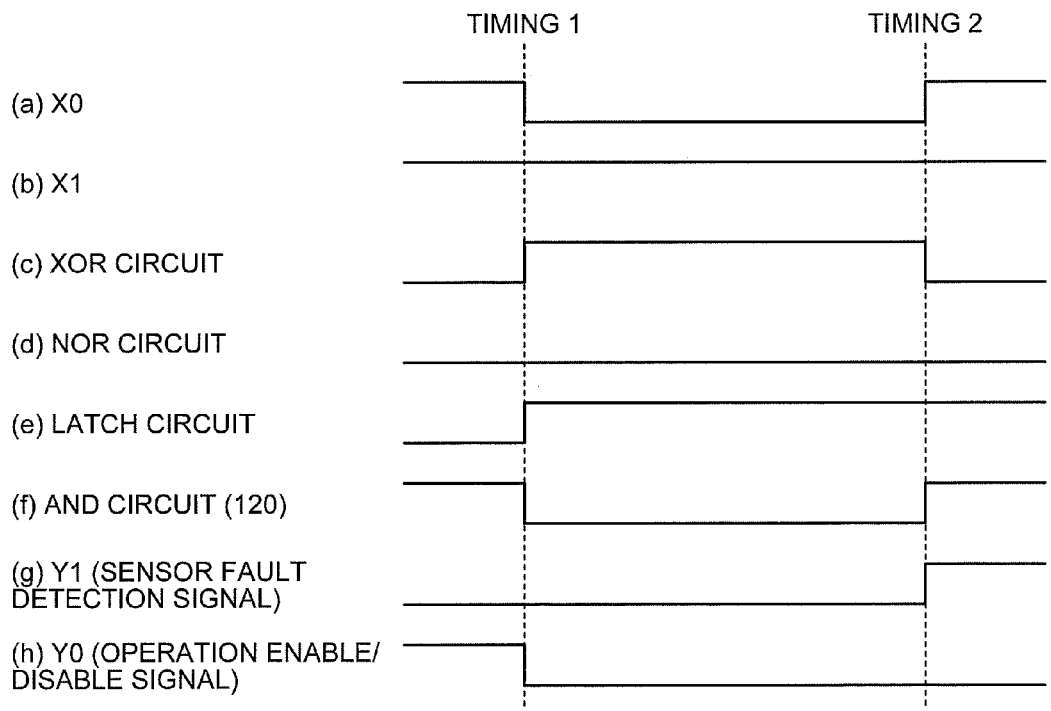

SAFETY APPARATUS AND FAULT DETECTION METHOD

CROSS REFERENCE TO RELATED APPLICATIONS

This application is a National Stage of International Application No. PCT/JP2010/057385 filed Apr. 26, 2010, the contents of all of which are incorporated herein by reference in their entirety.

FIELD

The present invention relates to a safety apparatus that enables/disables an operation of equipment based on input signals from multiplexed sensors for detecting a safety state of the equipment, and a fault detection method of a sensor of the safety apparatus.

BACKGROUND

In general, a safety-related system uses a safety apparatus that includes duplexed sensors for producing an ON output in a safe state and enables an operation when the two sensors produce ON outputs (for example, see Patent Literature 1). Moreover, ISO 13849-1 Category 4 requirements include designs such that (1) a single fault does not lead to the loss of a safety function, and (2) a single fault can be detected when or before a next safety function operates.

In order to make the foregoing safety apparatus comply with ISO 13849-1 Category 4, means for detecting a fault of either of the duplexed sensors before the occurrence of a next fault need to be implemented. Among conventional fault detecting means of a safety apparatus include ones that determine that either one of two sensors is failed if a state where input signals from the sensors are in an inconsistent state lasts for a predetermined time or more.

CITATION LIST

Patent Literature

Patent Literature 1: Japanese Patent Application Laid-Open No. 2005-326988

SUMMARY

Technical Problem

However, the timing for a sensor to produce an ON output varies depending on the type of the sensor and the position where the sensor is arranged. Consequently, using the foregoing conventional fault detecting means, it has sometimes been needed to change a set time for a fault determination depending on each target whose safety state is to be checked, and sometimes been not possible to determine a set time.

The present invention has been achieved in view of the foregoing, and it is an object thereof to provide a safety apparatus and a fault detection method that can easily detect a sensor fault.

Solution to Problem

In order to solve the above problem and in order to attain the above object, a safety apparatus of the present invention, includes: an input signal determination unit for determining whether input signals from a plurality of sensors each detecting a safety state of equipment are all in an ON state, all in an OFF state, or in an inconsistent state between the sensors; a first latch storage unit for retaining an inconsistent state record if the input signal determination unit determines that the input signals from the plurality of sensors are in an inconsistent state, and freeing the inconsistent state record if the input signal determination unit determines that the input signals from the plurality of sensors are all in an OFF state; a sensor fault determination unit for performing a sensor fault determination at first timing when the input signal determination unit determines that the input signals from the plurality of sensors are all in an ON state, the sensor fault determination including determining that at least one of the plurality of sensors is failed if the first latch storage unit retains the inconsistent state record and determining that none of the plurality of the sensors is failed if the first latch storage unit does not retain the inconsistent state record; and an operation enable/disable unit for enabling/disabling an operation of the equipment based on the input signals from the plurality of sensors and a determination result of the sensor fault determination by the sensor fault determination unit.

Advantageous Effects of Invention

The safety apparatus according to the present invention provides the effect that a sensor fault can be easily detected.

BRIEF DESCRIPTION OF DRAWINGS

FIG. 3 is a timing chart for explaining an operation pattern of the safety apparatus when no sensor fault is detected.

FIG. 4 is a timing chart for explaining an operation pattern of the safety apparatus when a sensor fault is detected.

DESCRIPTION OF EMBODIMENTS

Hereinafter, embodiments of the safety apparatus and the fault detection method according to the present invention will be described in detail with reference to the drawings. It should be noted that the present invention is not limited by these embodiments.

First Embodiment

Figure 1:
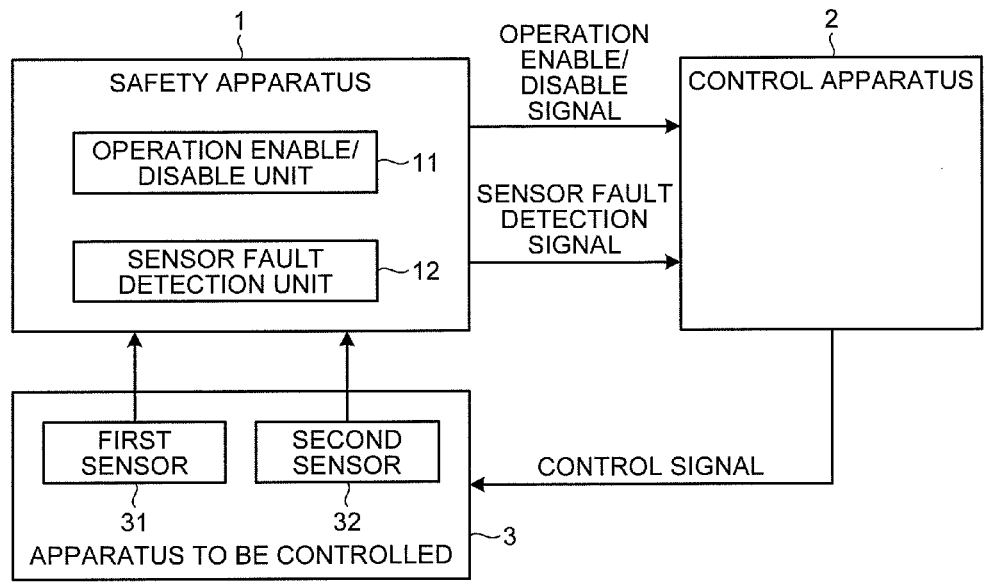
FIG. 1 is a diagram showing a system that uses a safety apparatus according to a first embodiment.

FIG. 1 is a diagram showing a system that uses a safety apparatus of a first embodiment according to the present invention. As shown in the diagram, the safety apparatus 1 is connected with an apparatus to be controlled 3 such as a piece of industrial equipment, and a control apparatus 2 which transmits a control signal for controlling the apparatus to be controlled 3 to the apparatus to be controlled 3.

The apparatus to be controlled 3 includes a plurality (here, two) of sensors (first sensor 31 and second sensor 32) for checking a safety state. Specific examples of the sensors 31 and 32 include a light curtain which detects the entry of a human body and the like into a mechanical drive section. In such a case, the light curtain produces an OFF output when the interruption of light is detected, and produces an ON output when no interruption is detected (i.e., when the entry of a human body is not detected). Among other examples of the sensors 31 and 32 is a door switch that is installed on a door for a human body to access a mechanical drive section through. In such a case, the door switch produces an OFF output when the door is in an open state, and produces an ON output when the door is in a closed state (i.e., when the entry of a human body is not detected). In other words, the sensors 31 and 32 are configured to produce an ON output when a safe state is detected, and produce an OFF output when a safe state fails to be observed. The output signals from the sensors 31 and 32 are both input to the safety apparatus 1.

The safety apparatus 1 includes an operation enable/disable unit 11 which determines whether to enable or disable an operation of the apparatus to be controlled 3 based on the input signals from the sensors 31 and 32, and a sensor fault detection unit 12 which detects a fault, if any, of either one of the sensors 31 and 32. The determination result of the operation enable/disable unit 11 is transmitted to the control apparatus 2 through an operation enable/disable signal line. The result of detection of a sensor fault by the sensor fault detection unit 12 is transmitted to the control apparatus 2 through a sensor fault detection signal line.

The control apparatus 2 can make the apparatus to be controlled 3 operate when an operation is enabled by the operation enable/disable signal, and stops the operation of the apparatus to be controlled 3 when not enabled. The control apparatus 2 also stops the operation of the apparatus to be controlled 3 when a sensor fault is notified by the sensor fault detection signal. When a sensor fault is notified, the control apparatus 2 may notify the sensor fault to a user.

Figure 2:
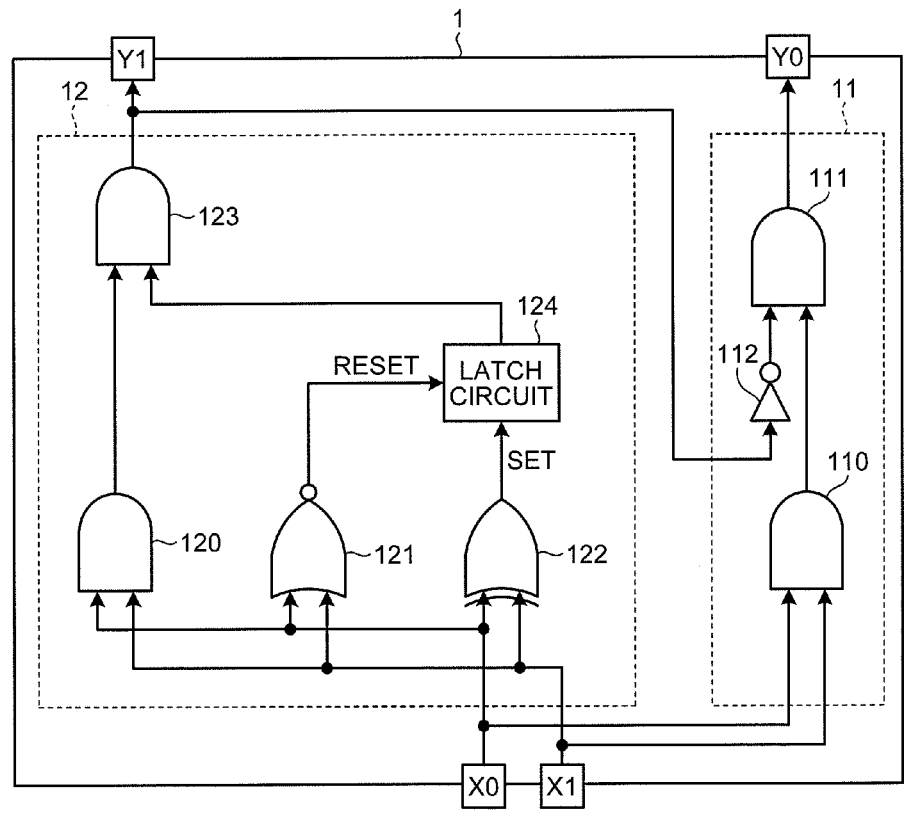
FIG. 2 is a diagram for explaining an example of the configuration of the safety apparatus according to the first embodiment.

FIG. 2 is a diagram showing an example of the configuration of the safety apparatus 1. In FIG. 2, X0 and X1 are input ports for sensor signals from the sensors 31 and 32, respectively. Y0 and Y1 are output ports for the operation enable/disable signal and the sensor fault detection signal, respectively. Suppose that the input signals from the sensors 31 and 32 indicate ON when in a high (1) state, and OFF when in a low (0) state. The operation enable/disable signal indicates an operation enabled state when in a high (1) state, and an operation disabled state when in a low (0) state. The sensor fault detection signal indicates a sensor fault detected state when in a high (1) state, and a sensor fault undetected state when in a low (0) state.

The operation enable/disable unit 11 includes an AND circuit 110, an AND circuit 111, and an inverter 112. The input signals (sensor inputs) input to X0 and X1 are input to the respective input terminals of the AND circuit 110. The operation result of the AND circuit 110 is input to one of the input terminals of the AND circuit 111. The detection result of the sensor fault detection unit 12 is input to the other input terminal of the AND circuit 111 through the inverter 112. The operation result of the AND circuit 111 is output to the control apparatus 2 through the port Y0. In other words, the operation enable/disable unit 11 enables the operation of the apparatus to be controlled 3 when both the sensors 31 and 32 provide ON outputs and the sensor fault detection unit 12 detects no sensor fault. The operation enable/disable unit 11 disables the operation of the apparatus to be controlled 3 when at least either one of the sensors 31 and 32 provides an OFF output or the sensor fault detection unit 12 detects a sensor fault.

The sensor fault detection unit 12 includes an AND circuit 120, a NOR circuit 121, an XOR circuit 122, an AND circuit 123 (sensor fault determination unit), and a latch circuit 124. The sensor input from X0 and the sensor input from X1 are input to the respective input terminals of each of the AND circuit 120, the NOR circuit 121, and the XOR circuit 123, which function as an input signal determination circuit that determines whether the input signals from the sensors 31 and 32 are all in an ON state, all in an OFF state, or in an inconsistent state between the sensors.

The latch circuit 124 functions as a first latch storage unit that retains a record on the determination of an inconsistent state when the input signals from the sensors 31 and 32 are determined to be in an inconsistent state, and frees the record when all the input signals are determined to be in an OFF state. Specifically, the operation result of the XOR circuit 122 is set into the latch circuit 124. The retained content of the XOR circuit 122 is reset by the operation result of the NOR circuit 121.

The operation result of the AND circuit 120 and the retained content of the latch circuit 124 are input to the respective input terminals of the AND circuit 123. The operation result of the AND circuit 123 is transmitted to the operation enable/disable unit 11 as the detection result of the sensor fault detection unit 12, and is output to the control apparatus 2 through the port Y1. In other words, when all the input signals are determined to be in an ON state, the AND circuit 123 brings the sensor fault detection signal into a sensor fault detected state if the latch circuit 124 retains a record on the determination of an inconsistent state. The AND circuit 123 brings the sensor fault detection signal into a sensor fault undetected state if the latch circuit 124 retains no such record.

Next, the operation of the safety apparatus 1 will be described with reference to FIGS. 3 and 4. FIG. 3 is a timing chart for explaining an operation pattern of the safety apparatus 1 when the safety apparatus 1 detects no sensor fault. FIGS. 3(a) and 3(b) show changes of the sensor inputs to X0 and X1, respectively; FIG. 3(c) shows a change of the output of the XOR circuit 122; FIG. 3(d) shows a change of the output of the NOR circuit 121; FIG. 3(e) shows a change of the output of the latch circuit 124; FIG. 3(f) shows a change of the output of the AND circuit 120; FIG. 3(g) shows a change of the output from Y1 (sensor fault detection signal); and FIG. 3(h) shows a change of the output from Y0 (operation enable/disable signal).

As shown in FIG. 3, when X0 changes from ON to OFF with X1 being in an ON state at timing 1 in the diagram, the XOR circuit 122 detects inconsistency between X0 and X1 and the output terminal of the XOR circuit 122 changes from low to high. The latch circuit 124 retains high. In addition, the output of the AND circuit 120 changes from high to low, and the operation enable/disable signal changes from an operation enabled state to an operation disabled state based on the change of the input from the AND circuit 120.

When X1 changes from ON to OFF at timing 2, the inconsistency between X0 and X1 disappears and the output of the XOR circuit 122 changes from high to low. The output terminal of the NOR circuit 121 changes from low to high. The latch circuit 124 is reset by the change and the retained content changes from high to low.

When X0 and X1 both change from OFF to ON at timing 3, the NOR circuit 121 changes from high to low and the AND circuit 120 changes from low to high. In any of the changes at timing 1 to 3, the two signals input to the AND circuit 123 do not become simultaneously high at any timing. The sensor fault detection signal therefore remains low, i.e., in a sensor fault undetected state throughout the changes at timing 1 to 3. At timing 3, the sensor fault detection signal is low and X0 and X1 are both ON, so that the operation enable/disable signal changes from an operation disabled state to an operation enabled state.

FIG. 4 is a timing chart for explaining an operation pattern of the safety apparatus 1 when the safety apparatus 1 detects a sensor fault. FIGS. 4(a) and 4(b) show the timing of the sensor inputs to X0 and X1, respectively; FIG. 4(c) shows the timing of the output of the XOR circuit 122; FIG. 4(d) shows the timing of the output of the NOR circuit 121; FIG. 4(e) shows the timing of the output of the latch circuit 124; FIG. 4(f) shows the timing of the output of the AND circuit 120; FIG. 4(g) shows the timing of the output from Y1 (sensor fault detection signal); and FIG. 4(h) shows the timing of the output from Y0 (operation enable/disable signal).

As shown in FIG. 4, when X0 changes from ON to OFF with X1 being in an ON state at timing 1 in the diagram, the output of the XOR circuit 122 changes from low to high and the latch circuit 124 is set to high like timing 1 of FIG. 3. The output of the AND circuit 120 changes from high to low, and the operation enable/disable signal changes from an operation enabled state to an operation disabled state.

Next, when X0 changes from OFF to ON at timing 2, the output of the XOR circuit 122 changes from high to low and the output of the AND circuit 120 changes from low to high. Since the retained content of the latch circuit 124 is not reset, the latch circuit 124 continues outputting high after the change at timing 1. Consequently, the two signals input to the AND circuit 123 both become high, so that the sensor fault detection signal changes from low to high (sensor fault detected state). Note that since the sensor fault detection signal is high, the operation enable/disable signal will not change to high (operation enabled state) even if X0 and X1 both become ON at timing 2.

Figure 5:
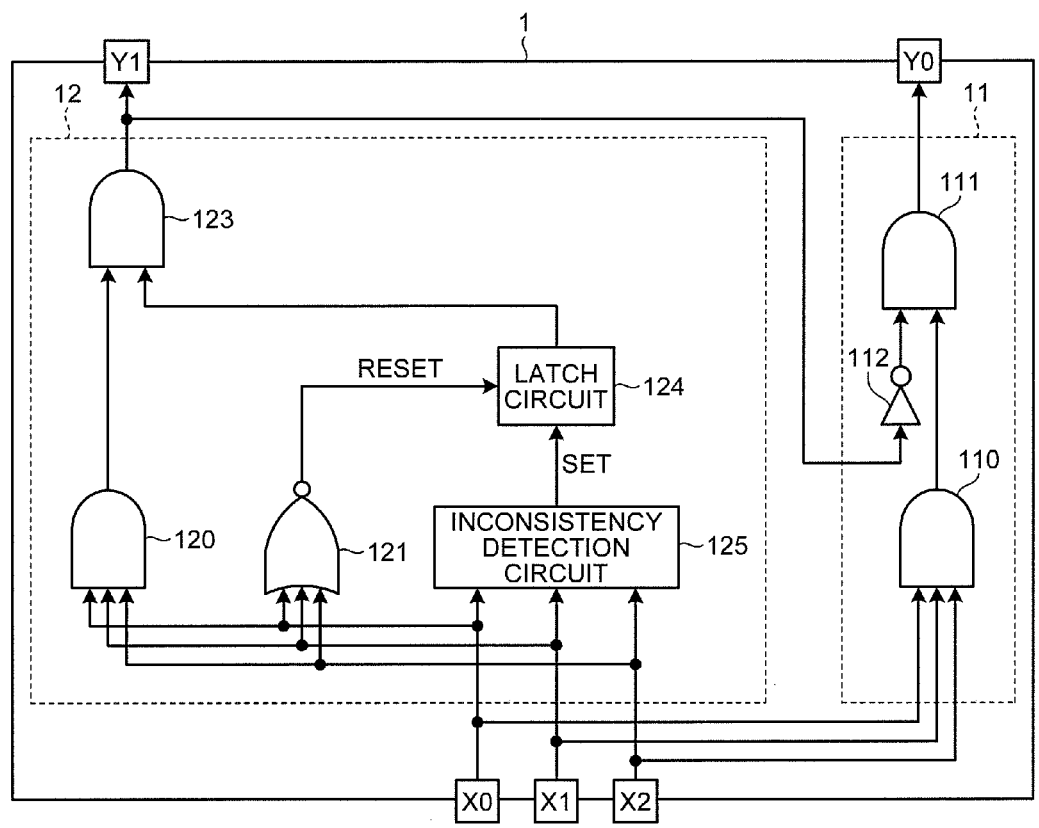
FIG. 5 is a diagram for explaining an example of the configuration of a safety apparatus that includes three input ports for sensor inputs.

While the foregoing description has dealt with the case where the safety apparatus 1 accepts the inputs from the two sensors 31 and 32 included in the apparatus to be controlled 3, and determines whether to enable or disable an operation and detects a sensor fault based on the accepted inputs, the apparatus to be controlled 3 may include three or more sensors, and whether to enable or disable an operation may be determined and a sensor fault may be detected based on such sensor inputs. FIG. 5 is a diagram for explaining an example of the configuration of a safety apparatus 1 that includes three input ports for sensor inputs. Sensor inputs from respective sensors are input to X0, X1, and X2. The safety apparatus 1 includes an inconsistency detection circuit 125 that detects inconsistency between the sensor inputs instead of the XOR circuit 122. The input signals from the three sensors are input to each of the AND circuit 120, the NOR circuit 121, the inconsistency detection circuit 125, and the AND circuit 110. The inconsistency detection circuit 125 detects inconsistency among the three input signals, and sets the detection result into the latch circuit 124.

As described above, the first embodiment of the present invention is configured to include: the latch circuit 124 which retains an inconsistent state record when the input signals from the plurality of sensors are in an inconsistent state, and frees the inconsistent state record when the input signals from the plurality of sensors are all in an OFF state; and the AND circuit 123 which performs a sensor fault determination at timing when the input signals from the plurality of sensors are all in an ON state, the sensor fault determination including determining that at least one of the plurality of sensors is failed if the latch circuit 124 retains the inconsistent state record and determining that none of the plurality of the sensors is failed if the latch circuit 124 retains no inconsistent state record. A sensor fault can thus be detected without the need to set a set time for fault detection as with conventional fault detect means that performs fault detection based on the duration of an inconsistent state. In other words, according to the first embodiment, a sensor fault can be easily detected.

Second Embodiment

In the configuration of the first embodiment, when all the signals change from an OFF state to ON through an inconsistent state, the inconsistency detection circuit (or XOR circuit) outputs a sensor fault detected state since all the signals become ON with the inconsistent state detected. The second embodiment is configured so that once all the signals become OFF, a sensor fault detected state will not be output even if all the signals become ON through an inconsistent state.

Figure 6:
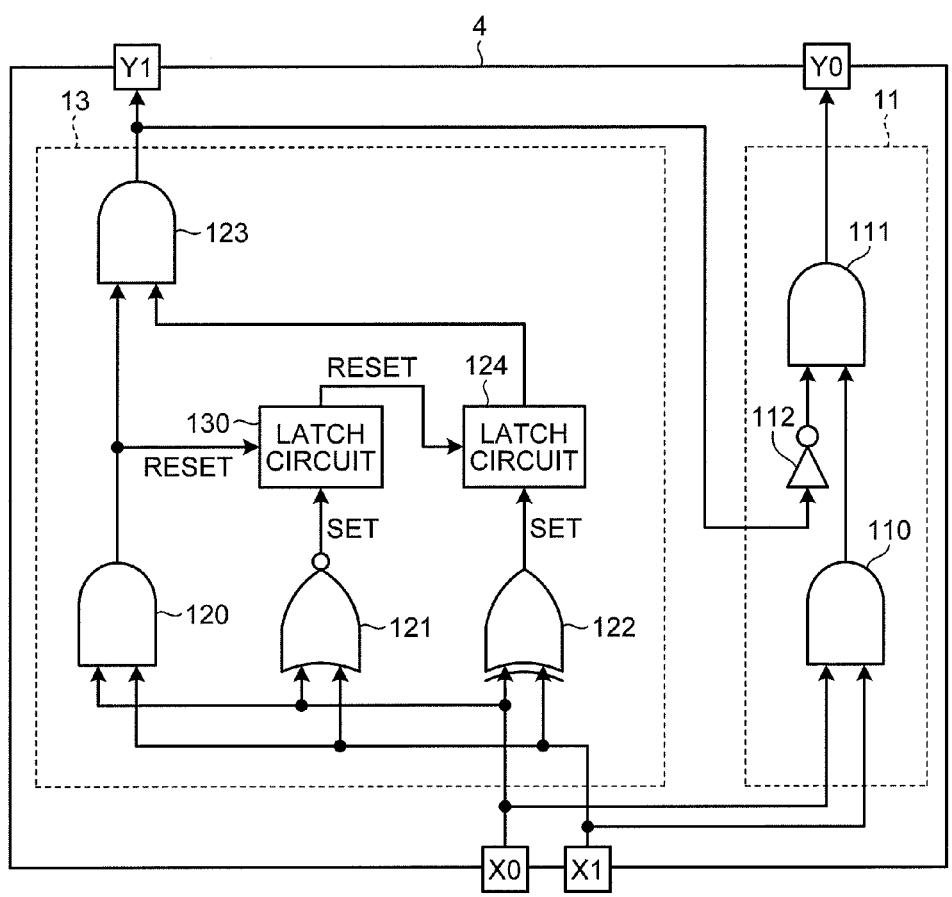
FIG. 6 is a diagram for explaining an example of the configuration of a safety apparatus according to a second embodiment.

FIG. 6 is a diagram showing an example of the configuration of the second embodiment of the safety apparatus according to the present invention. Here, the same components as those of the first embodiment will be designated by the same reference numerals as in the first embodiment, and a detailed description thereof will be omitted.

As shown in FIG. 6, a safety apparatus 4 includes an operation enable/disable unit 11 and a sensor fault detection unit 13. The operation enable/disable unit 11 includes an AND circuit 110, an AND circuit 111, and an inverter 112. The detection result of the sensor fault detection unit 13 is input to the inverter 112.

The sensor fault detection unit 13 includes an AND circuit 120, a NOR circuit 121, an XOR circuit 122, an AND circuit 123, a latch circuit 124, and a latch circuit 130. The latch circuit 130 functions as a second latch storage unit that retains an OFF state record if input signals from sensors are all in an OFF state, and frees the OFF state record if the input signals are all in an ON state. Specifically, the operation result of the NOR circuit 121 is set into the latch circuit 130. The set operation result is reset by the operation result of the AND circuit 120. The retained content of the latch circuit 130 is used as a reset input to the retained content of the latch circuit 124.

Figure 7:
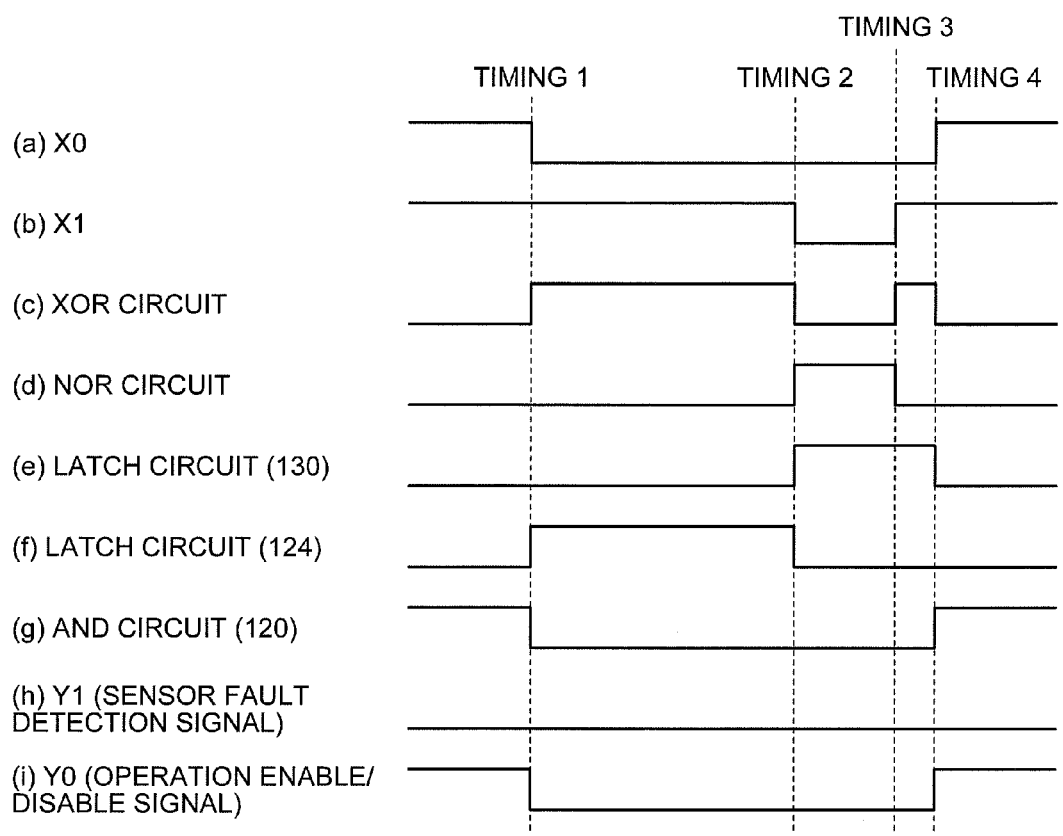
FIG. 7 is a timing chart for explaining an operation pattern when a sensor fault no sensor fault is detected.

FIG. 7 is a timing chart for explaining an operation pattern of the safety apparatus 4 when the safety apparatus 4 detects no sensor fault. FIGS. 7(a) and 7(b) show the timing of the sensor inputs to X0 and X1, respectively; FIG. 7(c) shows the timing of the output of the XOR circuit 122; FIG. 7(d) shows the timing of the output of the NOR circuit 121; FIG. 7(e) shows the timing of the output of the latch circuit 130; FIG. 7(f) shows the timing of the output of the latch circuit 124; FIG. 7(g) shows the timing of the output of the AND circuit 120; FIG. 7(h) shows the timing of the output from Y1 (sensor fault detection signal); and FIG. 7(i) shows the timing of the output from Y0 (operation enable/disable signal).

As shown in FIG. 7, when X0 changes from ON to OFF with X1 being in an ON state at timing 1 in the diagram, the output of the XOR circuit 122 changes from low to high. The latch circuit 124 is set to high, the output of the AND circuit 120 changes from high to low, and the operation enable/disable signal changes from an operation enabled state to an operation disabled state.

Next, when X1 changes from ON to OFF at timing 2, the output of the XOR circuit 122 changes from high to low and the output of the NOR circuit 121 changes from low to high. The latch circuit 130 is set to high by the change of the NOR circuit 121. This resets the latch circuit 124 to change the retained content from high to low. It should be appreciated that the latch circuit 130 continues inputting the reset input to the latch circuit 124 as long as the latch circuit 130 retains high.

Next, when X1 changes from OFF to ON with X0 being in an OFF state at timing 3, the output of the XOR circuit 122 changes from low to high and the output of the NOR circuit 121 changes from high to low. The latch circuit 130 continues retaining high even if the output of the NOR circuit 121 changes from high to low at timing 3. This means that the reset input continues being input, and the operation result of the XOR circuit 122, high, therefore will not be set into the latch circuit 124.

Then, when X0 changes from OFF to ON at timing 4, the output of the XOR circuit 122 changes from high to low and the output of the AND circuit 120 changes from low to high. Since the output of the AND circuit 120 becomes high, the retained content of the latch circuit 130 is reset from high to low. In any of the changes at timing 1 to 4, the two signals input to the AND circuit 123 do not become simultaneously high at any timing. The sensor fault detection signal therefore remains low throughout the changes at timing 1 to 4. At timing 4, since the sensor fault detection signal is low and X0 and X1 are both ON, the operation enable/disable signal changes from an operation disabled state to an operation enabled state.

Incidentally, according to the first embodiment, the sensors 31 and 32 enter an inconsistent state at timing 3 in FIG. 7. The output of the XOR circuit 122 therefore changes to high, and the latch circuit 124 is set to high. Subsequently, when the AND circuit 120 changes from low to high at timing 4, the two signals input to the AND circuit 123 both become high and the AND circuit 123 ends up outputting a sensor fault detected state.

Figure 8:
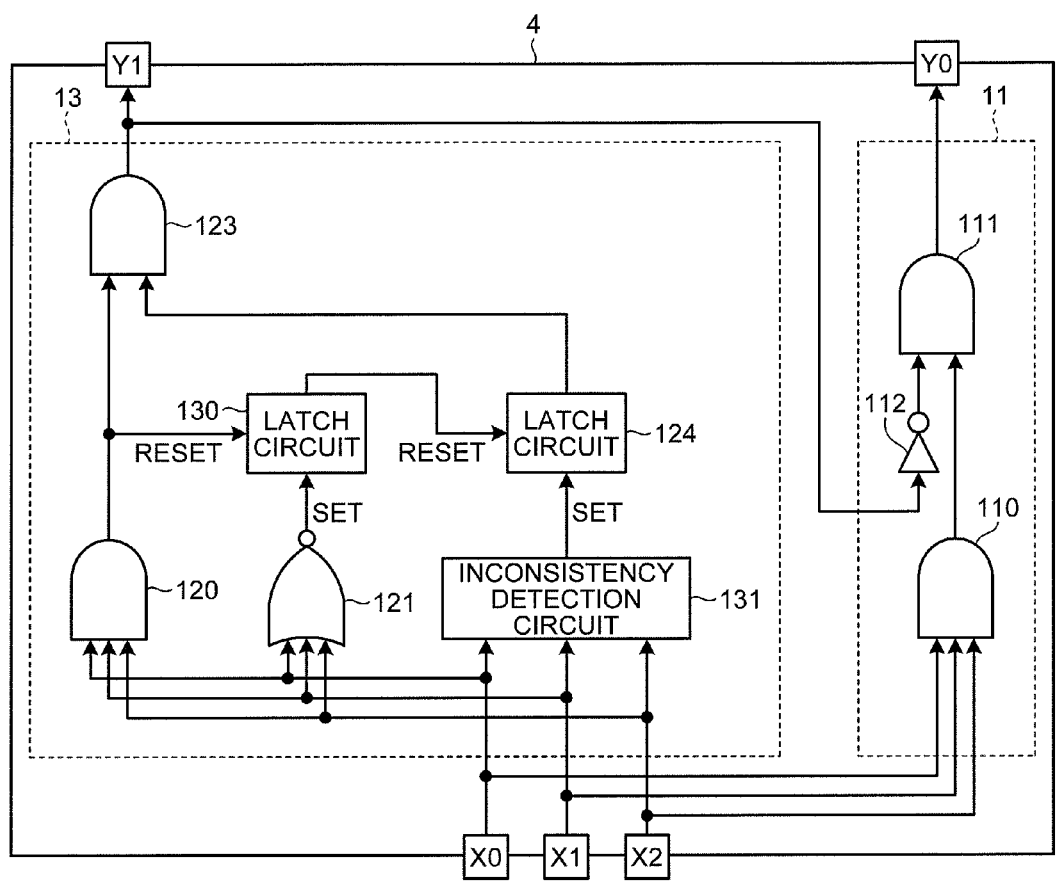
FIG. 8 is a diagram for explaining an example of the configuration of a safety apparatus that includes input ports from three sensors.

Even in the second embodiment, the apparatus to be controlled 3 may include three or more sensors, and the safety apparatus 4 may determine whether to enable or disable an operation and detect a sensor fault based on the outputs of such sensors. FIG. 8 is a diagram for explaining an example of the configuration of the safety apparatus 4 that includes input ports for three sensors. As shown in the diagram, the safety apparatus 4 includes an inconsistency detection circuit 131 instead of the XOR circuit 122. The inconsistency detection circuit 131 detects inconsistency among the signals X0 to X2.

As has been described above, according to the second embodiment, there is also provided the latch circuit 130 that retains an OFF state record if the input signals from the plurality of sensors are all in an OFF state, and frees the OFF state record when the input signals are all in an ON state. The latch circuit 130 is configured to input a reset input for freeing an inconsistent state record to the latch circuit 124 when the latch circuit 130 contains the OFF state record. A sensor fault can thus be detected easily. It is also possible to avoid a determination of a sensor fault when all the signals change from an OFF state to ON through an inconsistent state.

Third Embodiment

Figure 9:
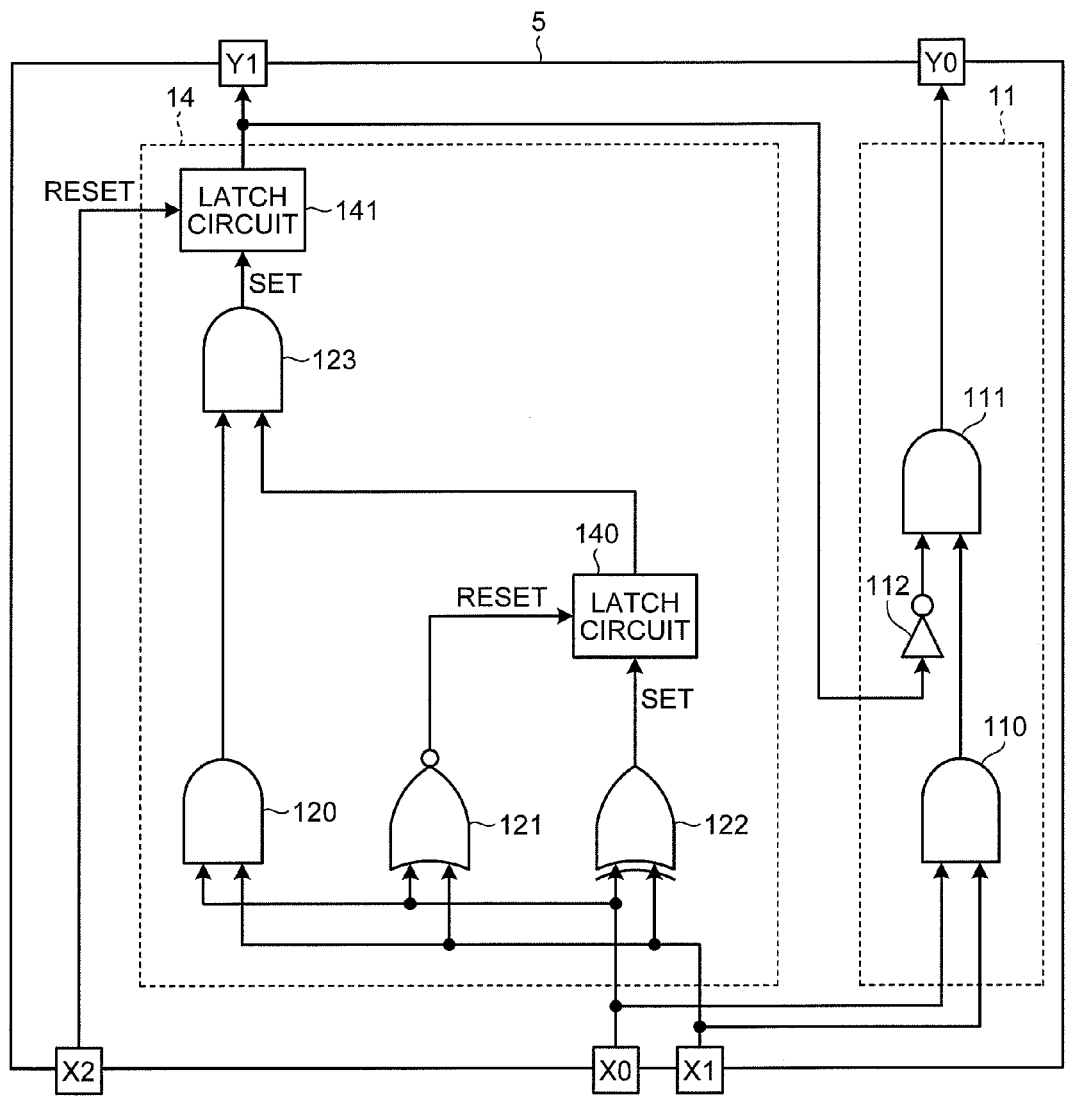
FIG. 9 is a diagram for explaining an example of the configuration of a safety apparatus according to a third embodiment.

FIG. 9 is a diagram showing an example of the configuration of a safety apparatus according to a third embodiment. As shown in the diagram, a safety apparatus 5 includes an operation enable/disable unit 11 and a sensor fault detection unit 14. The operation enable/disable unit 11 includes an AND circuit 110, an AND circuit 111, and an inverter 112. The detection result of the sensor fault detection unit 14 is input to the inverter 112.

The sensor fault detection unit 14 includes an AND circuit 120, a NOR circuit 121, an XOR circuit 122, an AND circuit 123, a nonvolatile latch circuit 140, and a nonvolatile latch circuit 141. The operation result of the XOR circuit 122 is set into the latch circuit 140, which is reset by the operation result of the NOR circuit 121. The operation result of the AND circuit 120 and the retained content of the latch circuit 140 are input to the respective input terminals of the AND circuit 123, which sets its operation result into the latch circuit 141. The latch circuit 141 outputs the retained content as a sensor fault detection signal. The safety apparatus 5 includes a port X2 to which a signal for resetting the retained content of the latch circuit 141 is input. Once the latch circuit 141 retains a sensor fault detected state, the latch circuit 141 continues retaining the retained content until a reset input is input from outside (for example, the control apparatus 2).

Even in the third embodiment, like the first embodiment, the safety apparatus 5 may be configured to determine whether to enable or disable an operation and detect a sensor fault based on the outputs of three or more sensors.

As described above, according to the third embodiment, the result of detection of an inconsistent state is set into the nonvolatile latch circuit 140, and the sensor fault detection signal is set into the nonvolatile latch circuit 141. The latch circuit 140 can thus continue retaining high even if a power supply is turned off, for example, between timing 1 and timing 2 in FIG. 4. The latch circuit 141 can continue retaining an operation disabled state even if the power supply is turned off at or after timing 2. In other words, according to the third embodiment, even when the power supply is turned off and the power supply is turned on again, an operation can be started at the same state as before the power-off. In addition to the same effects as those of the first embodiment, there is thus provided the effect of preventing a sensor fault from being overlooked due to power-off.

Fourth Embodiment

Figure 10:
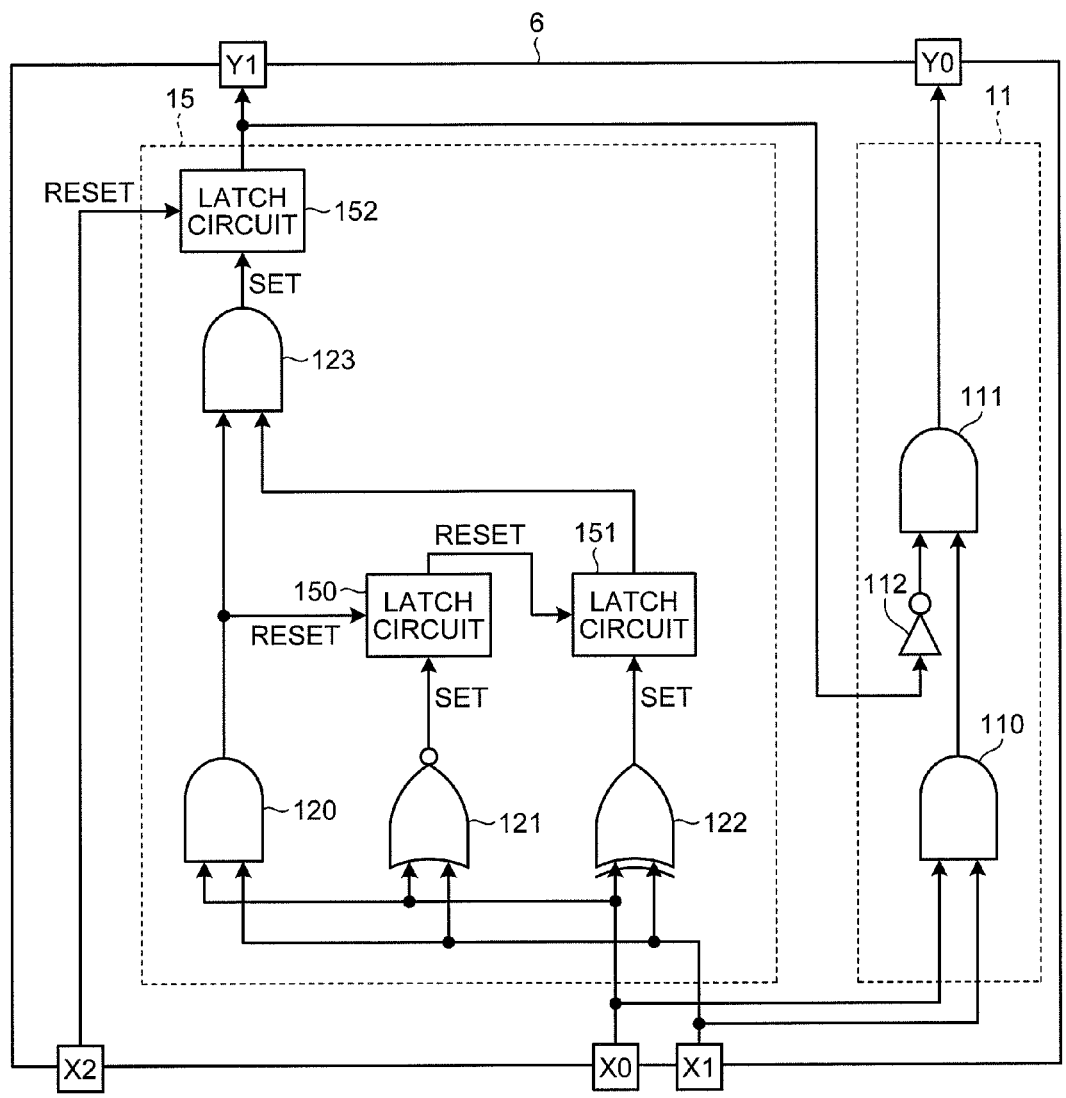
FIG. 10 is a diagram for explaining an example of the configuration of a safety apparatus according to a fourth embodiment.

FIG. 10 is a diagram showing an example of the configuration of a safety apparatus according to a fourth embodiment. As shown in the diagram, the safety apparatus 6 includes an operation enable/disable unit 11 and a sensor fault detection unit 15. The operation enable/disable unit 11 includes an AND circuit 110, an AND circuit 111, and an inverter 112. The detection result of the sensor fault detection unit 15 is input to the inverter 112.

The sensor fault detection unit 15 includes an AND circuit 120, a NOR circuit 121, an XOR circuit 122, an AND circuit 123, a nonvolatile latch circuit 150, a nonvolatile latch circuit 151, and a nonvolatile latch circuit 152. The operation result of the NOR circuit 121 is set into the latch circuit 150, which is reset by the operation result of the AND circuit 120. The retained content of the latch circuit 150 is used as a reset input to the retained content of the latch circuit 151.

The operation result of the AND circuit 120 and the retained content of the latch circuit 151 are input to the respective input terminals of the AND circuit 123, which sets its operation result into the latch circuit 152. The latch circuit 152 outputs the retained content as a sensor fault detection signal. The safety apparatus 6 also includes a port X2 to which a signal for resetting the retained content of the latch circuit 152 is input. Once the latch circuit 152 retains a sensor fault detected state, the latch circuit 152 continues retaining the retained content until a reset input is input from outside.

Even in the fourth embodiment, like the second embodiment, the safety apparatus 6 may be configured to determine whether to enable or disable an operation and detect a sensor fault based on the outputs of three or more sensors.

As described above, according to the fourth embodiment, the retained contents of the latch circuits 150, 151, and 152 are made nonvolatile. In addition to the effects of the second embodiment, the effect of preventing a sensor fault from being overlooked due to power-off is thus provided.

Fifth Embodiment

The safety apparatuses of the first to fourth embodiments detect a sensor fault at timing when all signals are in an ON state. The fifth embodiment is characterized in that a sensor fault can be detected at arbitrary timing in addition to the timing when all the signals are in an ON state.

Figure 11:
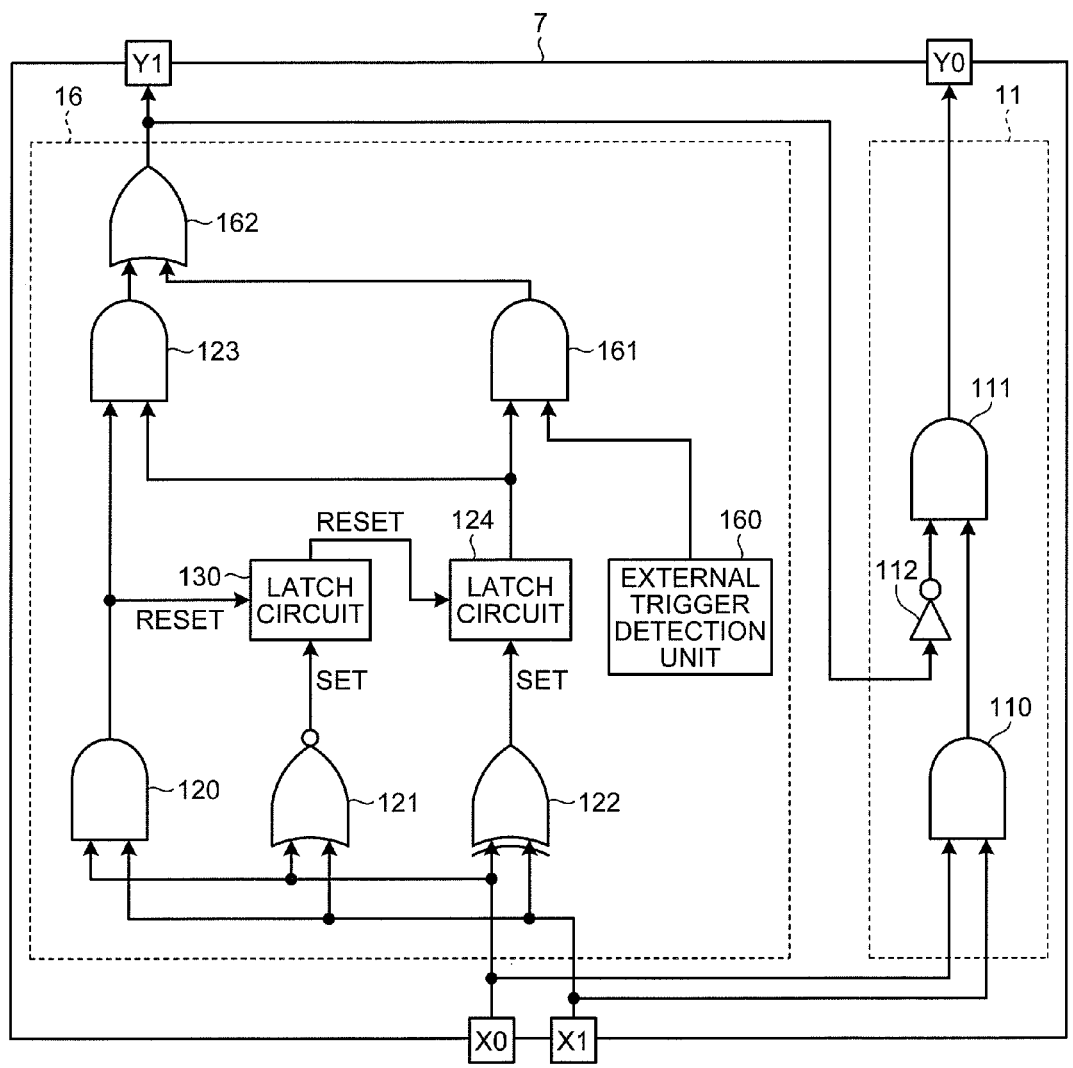
FIG. 11 is a diagram for explaining an example of the configuration of a safety apparatus according to a fifth embodiment.

FIG. 11 is a diagram showing an example of the configuration of a safety apparatus according to the fifth embodiment. As shown in the diagram, the safety apparatus 7 includes an operation enable/disable unit 11 and a sensor fault detection unit 16. The operation enable/disable unit 11 includes an AND circuit 110, an AND circuit 111, and an inverter 112. The detection result of the sensor fault detection unit 16 is input to the inverter 112.

The sensor fault detection unit 16 includes an AND circuit 120, a NOR circuit 121, an XOR circuit 122, an AND circuit 123, a latch circuit 124, a latch circuit 130, an external trigger detection unit 160, an AND circuit 161, and an OR circuit 162.

The external trigger detection unit 160 monitors a trigger input from outside. For example, the trigger input may be an input from a switch for generating the trigger. The external trigger detection unit 160 may monitor the power supplies of the control apparatus 2 and the apparatus to be controlled 3 and use the power-off of the monitored apparatuses as an external trigger. The retained content of the latch circuit 124 and the detection content of the external trigger detection unit 160 are input to the input terminals of the AND circuit 161. The operation result of the AND circuit 123 and the operation result of the AND circuit 161 are input to the input terminals of the OR circuit 162, which outputs its operation result as a sensor fault detection signal.

With such a configuration, when the latch circuit 124 becomes high while the external trigger detection unit 160 is detecting a trigger-on, the two signals input to the AND circuit 161 both become high. Here, the output of the OR circuit 162 changes from low to high regardless of the operation result of the AND circuit 123. That is, according to the fifth embodiment, a sensor fault can be detected at arbitrary timing in addition to the timing when all the signals are in an ON state.

While the safety apparatus 7 is configured to include the external trigger detection unit 160, the AND circuit 161, and the OR circuit 162 in addition to the configuration of the second embodiment, the three components may be added to the configuration of the first embodiment.

Sixth Embodiment

The safety apparatuses of the first to fourth embodiments detect a sensor fault at timing when all signals become ON. In the sixth embodiment, a sensor fault is determined to be present if a state where all the signals are OFF changes to an inconsistent state and the inconsistent state lasts for a predetermined time or more.

Figure 12:
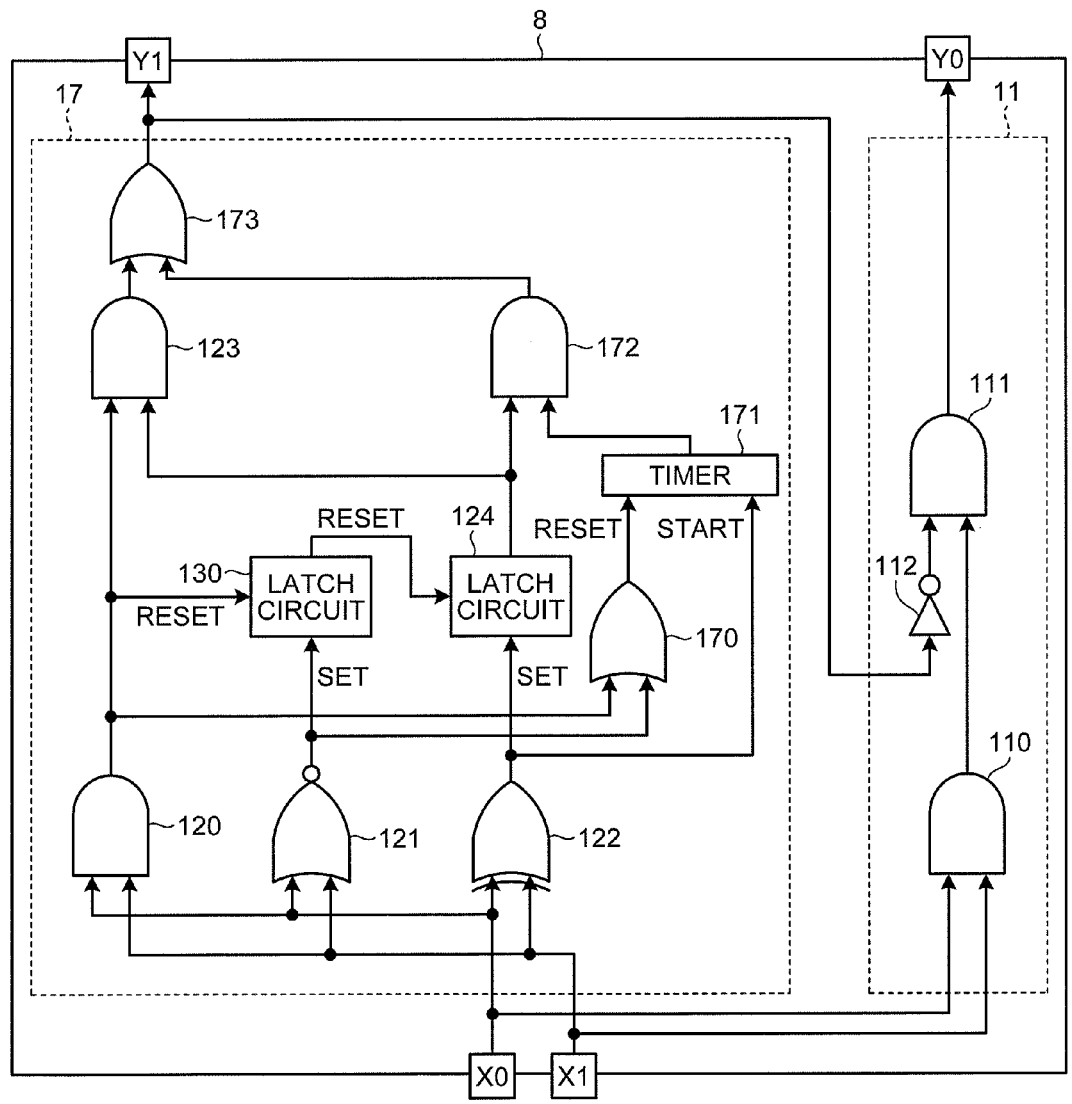
FIG. 12 is a diagram for explaining an example of the configuration of a safety apparatus according to a sixth embodiment.

FIG. 12 is a diagram showing an example of the configuration of a safety apparatus according to the sixth embodiment. As shown in the diagram, the safety apparatus 8 includes an operation enable/disable unit 11 and a sensor fault detection unit 17. The operation enable/disable unit 11 includes an AND circuit 110, an AND circuit 111, and an inverter 112. The detection result of the sensor fault detection unit 17 is input to the inverter 112.

The sensor fault detection unit 17 includes an AND circuit 120, a NOR circuit 121, an XOR circuit 122, an AND circuit 123, a latch circuit 124, a latch circuit 130, an OR circuit 170, a timer 171, an AND circuit 172, and an OR circuit 173.

The operation results of the AND circuit 120 and the NOR circuit 121 are input to the respective input terminals of the OR circuit 170. The timer 171, when started, counts up to a set time for determining a sensor fault. The timer 171 starts counting based on the operation result of the XOR circuit 122, and resets the count based on the operation result of the OR circuit 170. The retained content of the latch circuit 124 and the count result of the timer 171 are input to the input terminals of the AND circuit 172. The operation result of the AND circuit 123 and the operation result of the AND circuit 172 are input to the input terminals of the OR circuit 173, which outputs its operation result as a sensor fault detection signal.

With such a configuration, when all the signals become OFF and then change into an inconsistent state and the inconsistent state lasts for the set time set in the timer 171, a sensor fault detected state is output with the lapse of time as a trigger.

Even in the sixth embodiment, like the second embodiment, the safety apparatus 8 may be configured to determine whether to enable or disable an operation and detect a sensor fault based on the outputs of three or more sensors.

As described above, according to the sixth embodiment, the counter 171 that counts a predetermined set time is further provided, the counter 171 starting counting when the input signals from the sensors are determined to be in an inconsistent state and resetting the count when the input signals from the sensors are all in an ON state and when all in an OFF state. A sensor fault detection signal is brought into a sensor fault detected state if the latch circuit 124 is high at at least either one of timing when all the input signals from the sensors become an ON state or when the timer 171 has counted up to the set time. With such a configuration, in addition to the effects of the second embodiment, there is provided the effect that: even if either one of the sensors in an ON state is failed when a state where both the sensors should be in an OFF state lasts for a long time like between timing 1 and timing 2 in FIG. 7, the set time of the timer 171 can be appropriately set to detect the fault before the sensors both enter an ON state.

Mask circuits operable from outside may be interposed between the AND circuit 172 and the OR circuit 173 and between the AND circuit 123 and the OR circuit 173, respectively, so that the operation results of the AND circuit 172 and the AND circuit 123 can be masked. With such a configuration, the mask circuits can be operated to switch whether to perform fault detection at timing when both enter an ON state, perform fault detection at timing when the set time of the timer 171 has elapsed, or perform fault detection at both the timings.

While the safety apparatus 8 is configured to include the OR circuit 170, the timer 171, the AND circuit 172, and the OR circuit 173 in addition to the configuration of the second embodiment, the four components may be added to the configuration of the first embodiment.

Seventh Embodiment

The function of the sensor fault detection unit described in the first embodiment may be implemented by software. The seventh embodiment deals with a case where the operation of the sensor fault detection unit of the first embodiment is implemented by software.

Figure 13:
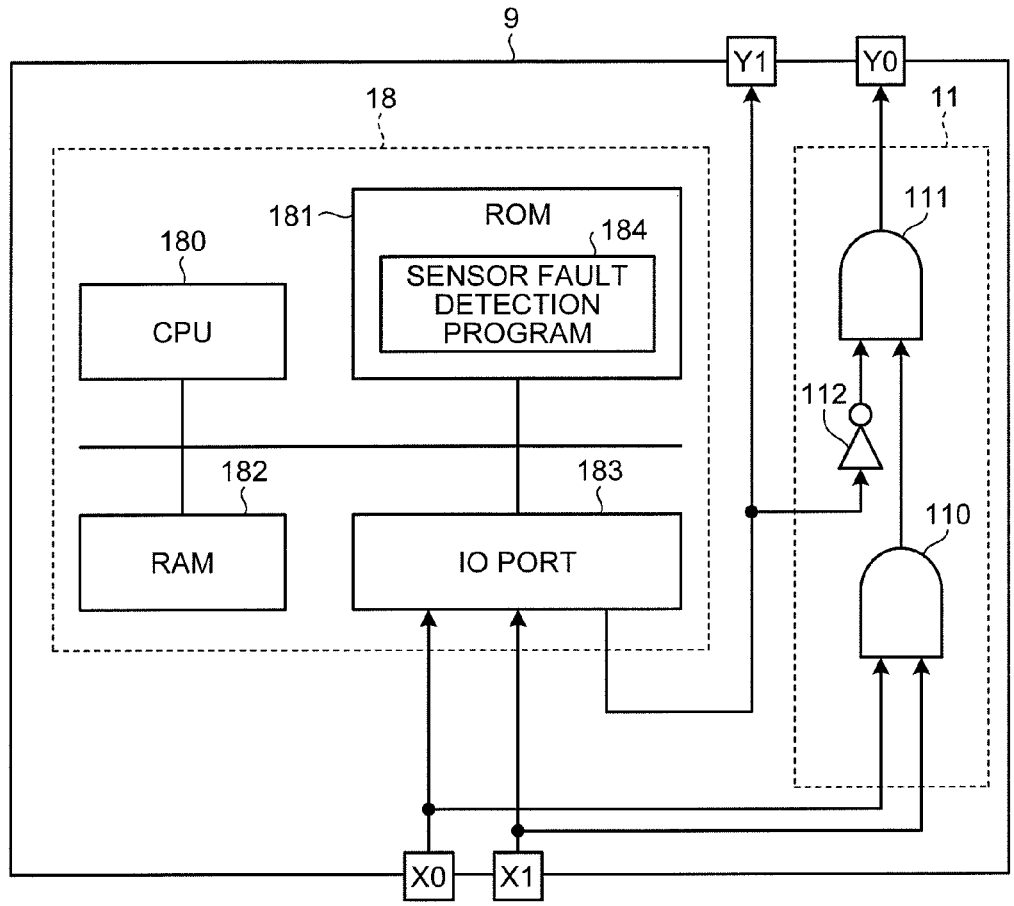
FIG. 13 is a diagram for explaining an example of the configuration of a safety apparatus according to a seventh embodiment.

FIG. 13 is a diagram showing an example of the configuration of a safety apparatus according to the seventh embodiment. As shown in the diagram, the safety apparatus 9 includes an operation enable/disable unit 11 and a sensor fault detection unit 18. The operation enable/disable unit 11 includes an AND circuit 110, an AND circuit 111, and an inverter 112. The detection result of the sensor fault detection unit 18 is input to the inverter 112.

Sensor inputs from sensors 31 and 32 are input to the sensor fault detection unit 18. The sensor fault detection unit 18 detects a fault of either one of the sensors 31 and 32 based on the sensor inputs, and outputs the detection result as a sensor fault detection signal. The sensor fault detection unit 18 has the same configuration as that of an ordinary computer, including a CPU 180, a ROM 181, a RAM 182, and an IO port 183. The CPU 180, the ROM 181, the RAM 182, and the IO port 183 are connected with each other through a bus.

The IO port 183 is a connection interface for accepting the input of the two sensor inputs and outputting the sensor fault detection signal. The ROM 181 contains a sensor fault detection program 184 which is a program for detecting a sensor fault. The sensor fault detection program 184 is transmitted to the RAM 182 and loaded into a program load area of the RAM 182 when the safety apparatus 9 is started up. The CPU 180 executes the sensor fault detection program 184 loaded into the RAM 182 to implement the function of the sensor fault detection unit 19.

Figure 14:
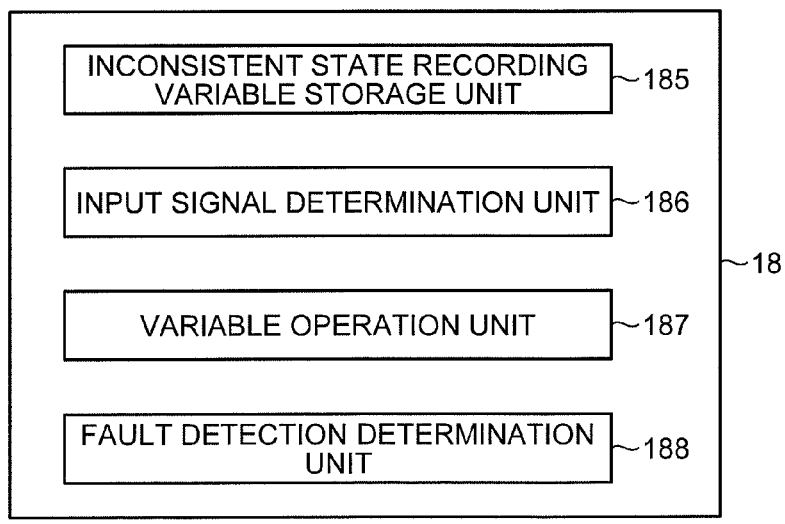
FIG. 14 is a diagram for explaining the functional configuration of a sensor fault detection unit.

FIG. 14 is a diagram for explaining the functional configuration of the sensor fault detection unit 18. As shown in the diagram, the sensor fault detection unit 18 includes: an inconsistent state recording variable storage unit 185 which contains an inconsistent state recording variable; an input signal determination unit 186 which determines whether the input signals from the two sensors are in an inconsistent state, both are in an ON state, or both are in an OFF state; a variable operation unit 187 which operates the inconsistent state recording variable based on a determination result of the input signal determination unit 186; and a fault detection determination unit 188 which determines whether the sensors 31 and 32 are failed based on the inconsistent state recording variable if the input signal determination unit 186 determines that the sensor inputs are both in an ON state. The inconsistent state recording variable storage unit 185 is reserved, for example, in the RAM 182 or a register included in the CPU 180.

It should be appreciated that the inconsistent state recording variable corresponds to the retained content of the latch circuit 124 in the safety apparatus 1 of the first embodiment.

Figure 15:
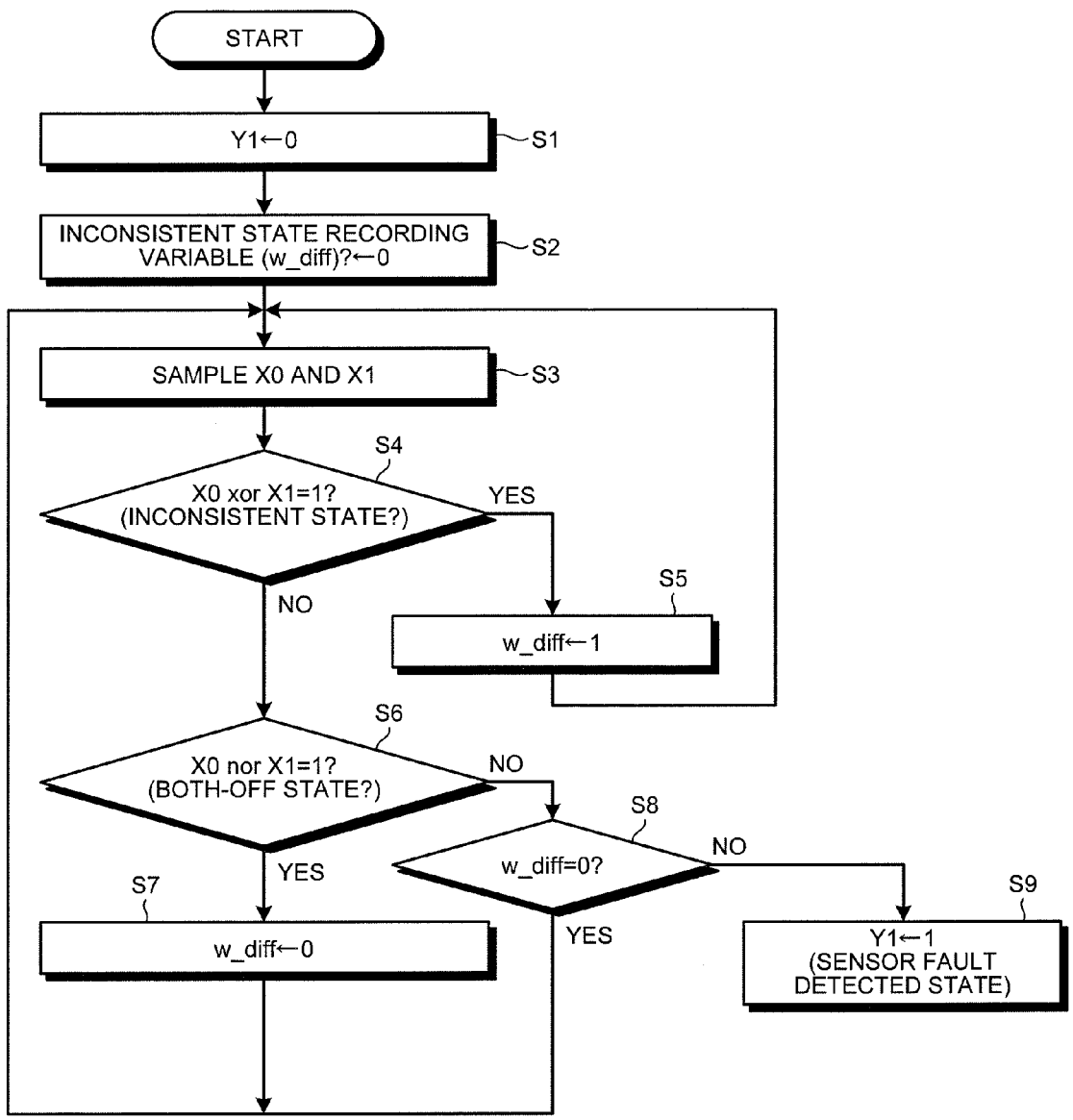
FIG. 15 is a flowchart for explaining a fault detection method that is implemented by the sensor fault detection unit.

FIG. 15 is a flowchart for explaining a fault detection method that is implemented by the sensor fault detection unit 18. As shown in the flowchart, when an operation is started, the fault detection determination unit 188 initially sets the sensor fault detection signal to a sensor fault undetected state (Y1=0) (step S1). The variable operation unit 187 makes the inconsistent state recording variable (w_diff)=0 (step S2). The input signal determination unit 186 acquires (samples) the sensor inputs input to X0 and X1 (step S3).

The input signal determination unit 186 determines whether the exclusive OR of the signal input to X0 and the signal input to X1 acquired is 1 (i.e., the sensor inputs are both in an inconsistent state) (step S4). If the exclusive OR of the two signals is 1 (step S4, Yes), the variable operation unit 187 makes w_diff=1 (step S5) and proceeds to step S3.

If the exclusive OR of the two signals is not 1 (step S4, No), the input signal determination unit 186 further determines whether the inversion of the logical OR of the two signals is 1 (i.e., a both-OFF state) (step S6). If the inversion of the logical OR of the two signals is 1 (step S6, Yes), the variable operation unit 187 makes w_diff=0 (step S7) and proceeds to step S3.

If the inversion of the logical OR of the two signals is not 1 (step S6, No), the two sensor inputs are in a both-ON state. The fault detection determination unit 188 determines whether w_diff=0 (step S8). If w_diff is not equal to 0 (step S8, No), the fault detection determination unit 188 sets Y1=1 (sensor fault detected state) (step S9). If w_diff=0 (step S8, Yes), the fault detection determination unit 188 proceeds to step S3.

In the foregoing description, the operation enable/disable unit 11 may also be configured as a computer, and the operation of the operation enable/disable unit 11 may be implemented by executing a program. The program for implementing the operation of the operation enable/disable unit 11 and the sensor fault detection program 184 may be run on the same computer.

Even in the seventh embodiment, like the first embodiment, the safety apparatus 9 may be configured to determine whether to enable or disable an operation and detect a sensor fault based on the outputs of three or more sensors.

As described above, input signals are acquired from a plurality of sensors (step S3), and whether the input signals are all in an ON state, all in an OFF state, or in an inconsistent state is determined (step S4, step S6). If the determination result indicates an inconsistent state, w_diff is set to 1 (step S5). If the determination result indicates all being in an OFF state, w_diff is set to 0 (step S7). If the determination result indicates all being in an ON state and when w_diff=0, it is determined that at least one of the plurality of sensors is failed (step S9). With such a configuration, a sensor fault can be easily detected like the first embodiment.

Eighth Embodiment

The eighth embodiment deals with a case where the function of the sensor fault detection unit described in the second embodiment is implemented by software.

Figure 16:
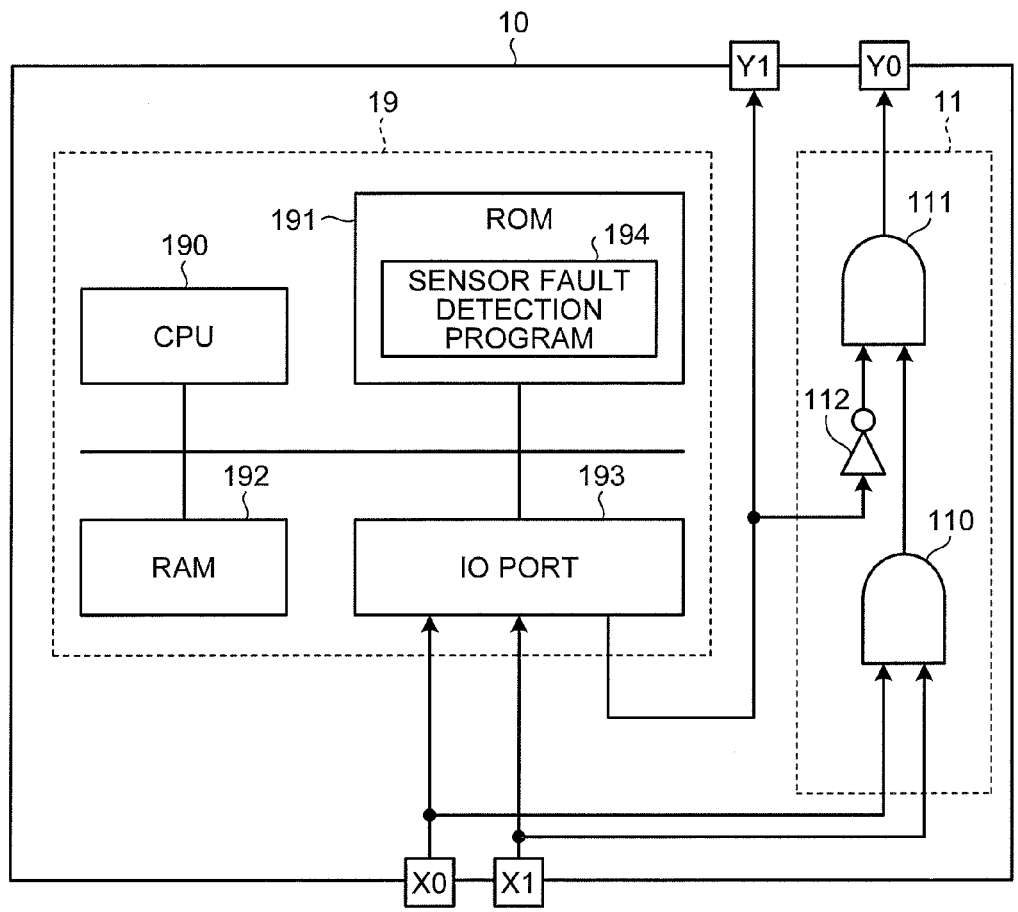
FIG. 16 is a diagram for explaining an example of the configuration of a safety apparatus according to an eighth embodiment.

FIG. 16 is a diagram showing an example of the configuration of a safety apparatus according to the eighth embodiment. As shown in the diagram, the safety apparatus 10 includes an operation enable/disable unit 11 and a sensor fault detection unit 19. The operation enable/disable unit 11 includes an AND circuit 110, an AND circuit 111, and an inverter 112. The detection result of the sensor fault detection unit 19 is input to the inverter 112.

Sensor inputs from sensors 31 and 32 are input to the sensor fault detection unit 19. The sensor fault detection unit 19 detects a fault of either one of the sensors 31 and 32 based on the sensor inputs, and outputs the detection result as a sensor fault detection signal. The sensor fault detection unit 19 has the same configuration as that of an ordinary computer, including a CPU 190, a ROM 191, a RAM 192, and an IO port 193. The CPU 190, the ROM 191, the RAM 192, and the IO port 193 are connected with each other through a bus.

The IO port 193 is a connection interface for accepting the input of the two sensor inputs and outputting the sensor fault detection signal. The ROM 191 contains a sensor fault detection program 194 which is a program for detecting a sensor fault. The sensor fault detection program 194 is transmitted to the RAM 192 and loaded into a program load area of the RAM 192 when the safety apparatus 10 is started up. The CPU 190 executes the sensor fault detection program 194 loaded into the RAM 192 to implement the function of the sensor fault detection unit 19.

Figure 17:
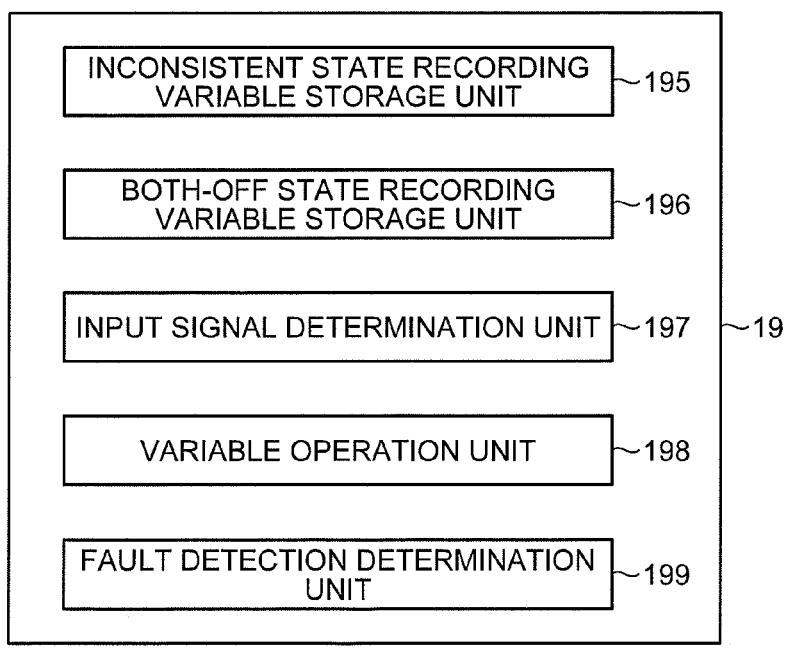
FIG. 17 is a diagram for explaining the functional configuration of a sensor fault detection unit.

FIG. 17 is a diagram for explaining the functional configuration of the sensor fault detection unit 19. As shown in the diagram, the sensor fault detection unit 19 includes: an inconsistent state recording variable storage unit 195 which contains an inconsistent state recording variable; a both-OFF state recording variable storage unit 196 which contains a both-OFF state recording variable; an input signal determination unit 197 which determines whether the input signals from the two sensors are in an inconsistent state, both are in an ON state, or both are in an OFF state; a variable operation unit 198 which operates the inconsistent state recording variable and the both-OFF state recording variable based on a determination result of the input signal determination unit 197; and a fault detection determination unit 199 which determines whether the sensors 31 and 32 are failed based on the inconsistent state recording variable if the input signal determination unit 197 determines that the sensor inputs are both in an ON state. The inconsistent state recording variable storage unit 195 and the both-OFF state recording variable storage unit 196 are reserved, for example, in the RAM 192 or a register included in the CPU 190.

Figure 18:
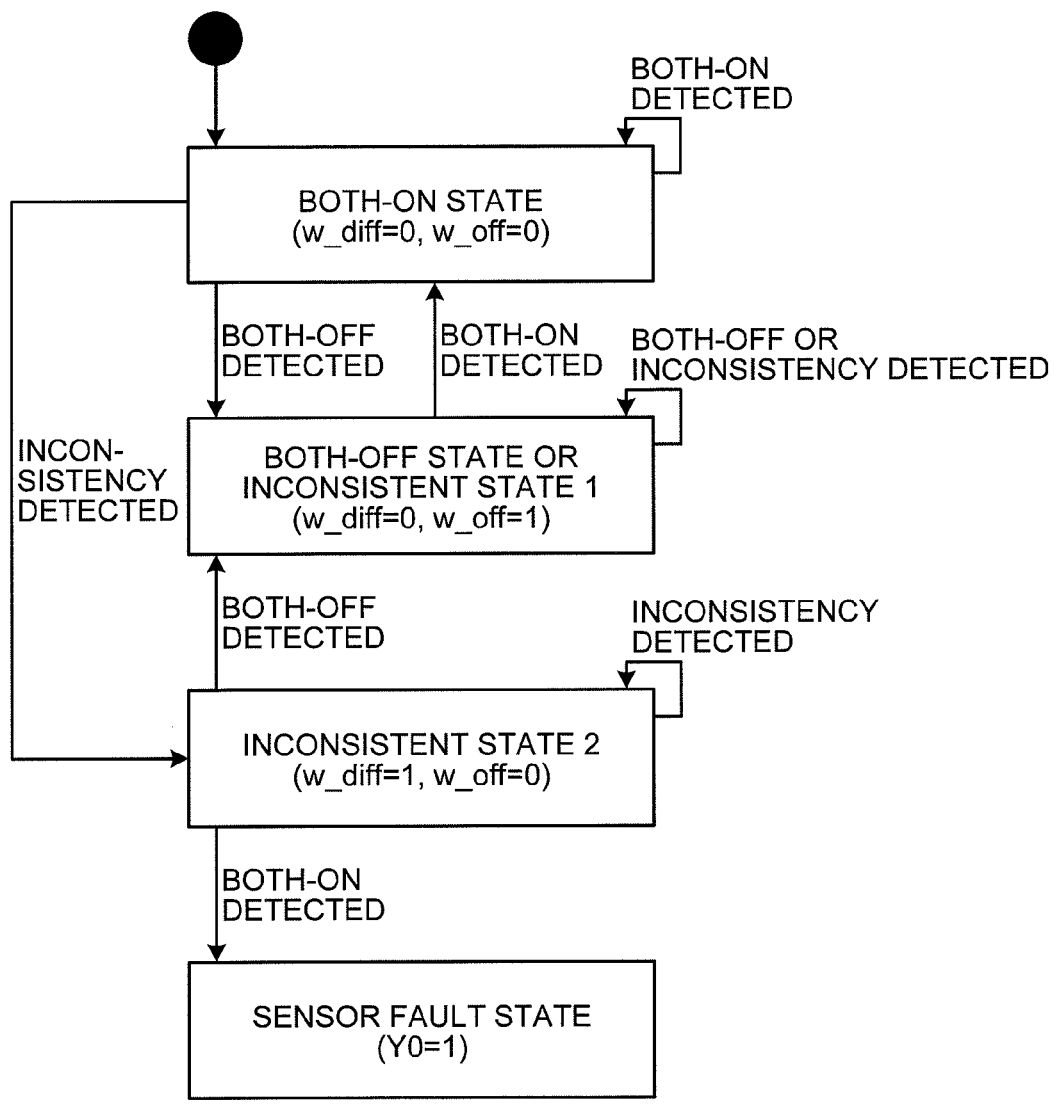
FIG. 18 is a state chart for explaining the operation of the sensor fault detection unit.

FIG. 18 is a state chart for explaining the operation of the sensor fault detection unit 19. As shown in the chart, three states [a both-ON state (w_diff=0 and w_off=0), a both-OFF state or inconsistent state 1 (w_diff=0 and w_off=1), and an inconsistent state 2 (w_diff=1 and w_off=0)] can be distinguished according to respective combinations of the values of the inconsistent state recording variable (w_diff) and the both-OFF state recording variable (w_off). Here, the inconsistent state 1 refers to an inconsistent state changed from the both-OFF state. The inconsistent state 2 refers to an inconsistent state changed from the both-ON state. The variable operation unit 198 operates the two variables based on the determination result of the input signal determination unit 197. In other words, the variable operation unit 198 controls the transitions among the foregoing three states shown in FIG. 18. The fault detection determination unit 199 sets the sensor fault detection signal to a sensor fault detected state if the input signal determination unit 197 determines the both-ON state to be present when the state is the inconsistent state 2.

Note that the inconsistent state recording variable corresponds to the retained content of the latch circuit 124 in the safety apparatus 4 according to the second embodiment. The both-OFF state recording variable corresponds to the retained content of the latch circuit 130 in the safety apparatus 4 of the second embodiment.

Figure 19:
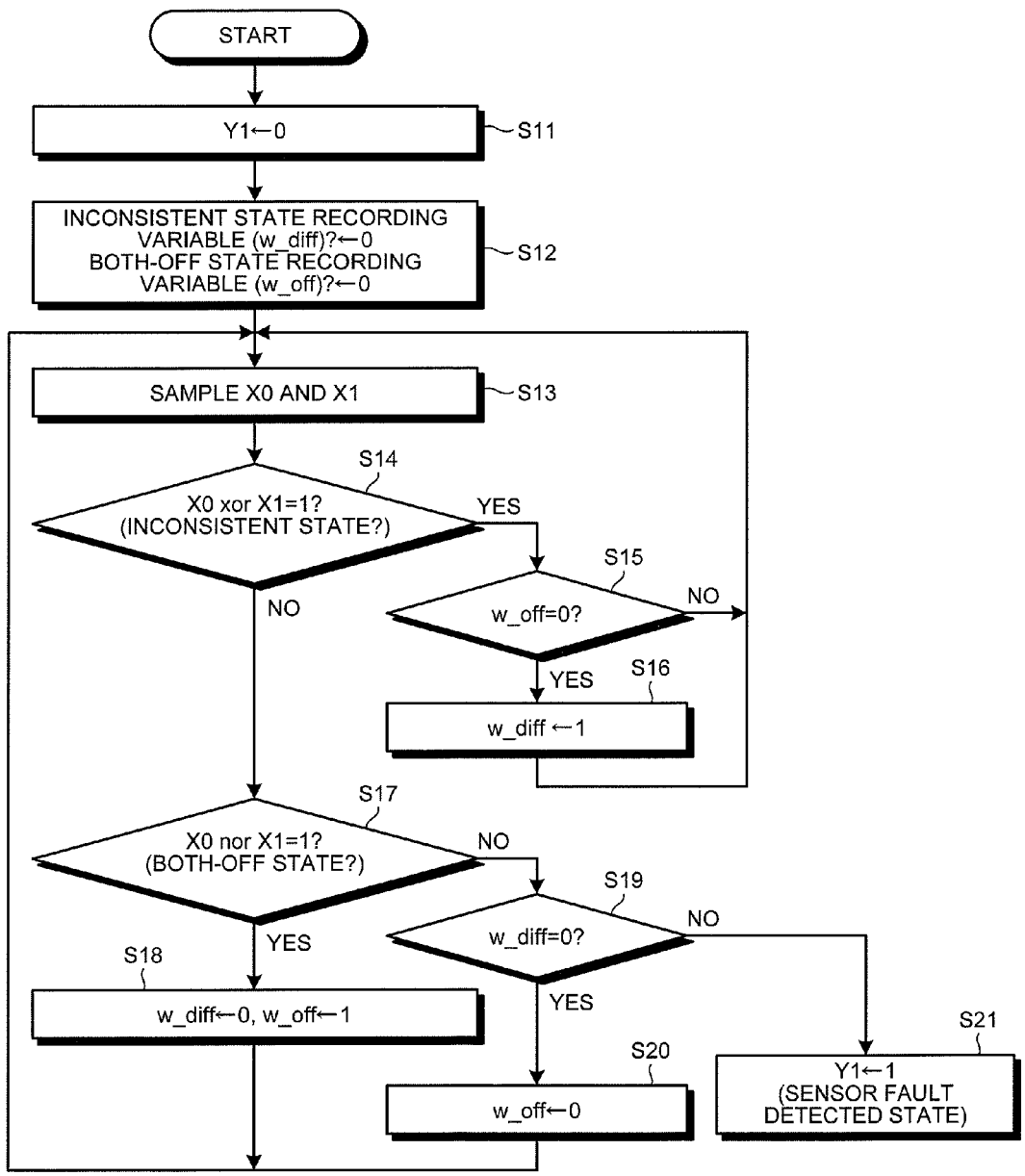
FIG. 19 is a flowchart for explaining a fault detection method that is implemented by the sensor fault detection unit.

FIG. 19 is a flowchart for explaining a fault detection method that is implemented by the sensor fault detection unit 19. As shown in the flowchart, when an operation is started, the fault detection determination unit 199 initially sets the sensor fault detection signal to a sensor fault undetected state (Y1=0) (step S11). The variable operation unit 198 makes w_diff=0 and w_off=0 (step S12). The input signal determination unit 197 then acquires (samples) the sensor inputs input to X0 and X1 (step S13).

The input signal determination unit 197 determines whether the exclusive OR of the signal input to X0 and the signal input to X1 acquired is 1 (i.e., the sensor inputs are both in an inconsistent state) (step S14). If the exclusive OR of the two signals is 1 (step S14, Yes), the variable operation unit 198 determines whether w_off=0 (step S15). If w_off=0 (step S15, Yes), the variable operation unit 198 makes w_diff=1 (step S16) and proceeds to step S13. If w_off is not equal to 0 (step S15, No), step S16 is skipped.

If the exclusive OR of the two signals is not 1 (step S14, No), the input signal determination unit 197 further determines whether the inversion of the logical OR of the two signals is 1 (i.e., in a both-OFF state) (step S17). If the inversion of the logical OR of the two signals is 1 (step S17, Yes), the variable operation unit 198 makes w_diff=0 and w_off=1 (step S18) and proceeds to step S13.

If the inversion of the logical OR of the two signals is not 1 (step S17, No), the two sensor inputs are in a both-ON state. The fault detection determination unit 199 determines whether w_diff=0 (step S19). If w_diff is not equal to 0 (step S19, No), the fault detection determination unit 199 makes Y1=1 (sensor fault detected state) (step S21). If w_diff=0 (step S19, Yes), the variable operation unit 198 makes w_off=0 (step S20) and proceeds to step S13.

In the foregoing description, the operation enable/disable unit 11 may also be configured as a computer, and the operation of the operation enable/disable unit 11 may be implemented by executing a program. The program for implementing the operation of the operation enable/disable unit 11 and the sensor fault detection program 194 may be run on the same computer.

Even in the eighth embodiment, like the second embodiment, the safety apparatus 10 may be configured to determine whether to enable or disable an operation and detect a sensor fault based on the outputs of three or more sensors.

As described above, according to the eighth embodiment, input signals are acquired from a plurality of sensors (step S12), and whether the input signals are all in an ON state, all in an OFF state, or in an inconsistent state is determined (step S14, step S17). If the determination result indicates that all are in an OFF state, w_diff is set to 0 and w_off is set to 1 (step S18). If the determination result indicates an inconsistent state and when w_off=0, w_diff is set to 1 (step S16). If the determination result indicates that all are in an ON state and when w_diff=0, w_off is set to 0 (step S20). When w_diff=1, it is determined that at least one of the plurality of sensors is failed (step S21). With such a configuration, a sensor fault can be easily detected like the second embodiment. It is also possible to prevent a determination of a sensor fault from being made when all the signals change from an OFF state to ON through an inconsistent state.

INDUSTRIAL APPLICABILITY

As described above, the safety apparatus and the fault detection method according to the present invention are suitably applied to a safety apparatus that enables/disables an operation of equipment based on input signals from multiplexed sensors for detecting a safety state of the equipment, and a fault detection method of a sensor of such a safety apparatus.

REFERENCE SIGNS LIST 1, 4 to 10 safety apparatus
2 control apparatus
3 apparatus to be controlled
11 operation enable/disable unit
12 to 19 sensor fault detection unit
31 first sensor
32 second sensor
110, 111, 120, 123, 161, 172 AND circuit
112 inverter
121 NOR circuit
122 XOR circuit
124, 130, 140, 141, 150, 151, 152 latch circuit
125, 131 inconsistency detection circuit
160 external trigger detection unit
162, 170, 173 OR circuit
171 timer
180, 190 CPU
181, 191 ROM
182, 192 RAM
183, 193 IO port
184, 194 sensor fault detection program
185, 195 inconsistent state recording variable storage unit
186, 196 input signal determination unit
187, 197 variable operation unit
188, 198 fault detection determination unit
196 both-OFF state recording variable storage unit

The invention claimed is:

1. A safety apparatus comprising:
an input signal determination unit for determining whether input signals from a plurality of sensors each detecting a safety state of equipment are all in an ON state, all in an OFF state, or in an inconsistent state between the sensors;
a first latch storage unit for retaining an inconsistent state record if the input signal determination unit determines that the input signals from the plurality of sensors are in an inconsistent state, and freeing the inconsistent state record if the input signal determination unit determines that the input signals from the plurality of sensors are all in an OFF state;
a sensor fault determination unit for performing a sensor fault determination at first timing when the input signal determination unit determines that the input signals from the plurality of sensors are all in an ON state, the sensor fault determination including determining that at least one of the plurality of sensors is failed if the first latch storage unit retains the inconsistent state record and determining that none of the plurality of the sensors is failed if the first latch storage unit does not retain the inconsistent state record; and
an operation enable/disable unit for enabling/disabling an operation of the equipment based on the input signals from the plurality of sensors and a determination result of the sensor fault determination by the sensor fault determination unit.

2. The safety apparatus according to claim 1, further comprising a second latch storage unit for retaining an OFF state record if the input signal determination unit determines that the input signals from the plurality of sensors are all in an OFF state, and freeing the OFF state record if the input signal determination unit determines that the input signals from the plurality of sensors are all in an ON state, and wherein
if the second latch storage unit retains the OFF state record, the second latch storage unit inputs a reset input for freeing the inconsistent state record to the first latch storage unit.

3. The safety apparatus according to claim 1, wherein:
the first latch storage unit is nonvolatile; and
the sensor fault determination unit further includes a nonvolatile third latch storage unit for retaining the determination result of the sensor fault determination.

4. The safety apparatus according to claim 2, wherein:
the first latch storage unit and the second latch storage unit are nonvolatile; and
the sensor fault determination unit further includes a nonvolatile third latch storage unit for retaining the determination result of the sensor fault determination.

5. The safety apparatus according to claim 3, wherein the third latch storage unit frees the determination result of the sensor fault determination when a reset input from outside is input.

6. The safety apparatus according to claim 1, further comprising an external trigger detection unit for detecting a trigger from outside, and wherein
the sensor fault determination unit performs the sensor fault determination at second timing when the external trigger detection unit detects a trigger, in addition to the first timing.

7. The safety apparatus according to claim 6, wherein the trigger from outside is a power-off signal.

8. The safety apparatus according to claim 1, further comprising a counter for counting a predetermined set time, the counter starting counting when the input signal determination unit determines that the input signals from the plurality of sensors are in an inconsistent state, and resetting the count when the input signal determination unit determines that the input signals from the plurality of sensors are all in an ON state and when all in an OFF state, and wherein
the sensor fault determination unit performs the sensor fault determination at third timing when the timer has counted up to the set time, in addition to the first timing.

9. A fault detection method by which a safety apparatus that enables/disables an operation of equipment based on input signals from a plurality of sensors each detecting a safety state of the equipment detects a fault of the plurality of sensors, the fault detection method comprising:
a first step of acquiring the input signals from the plurality of sensors;
a second step of determining whether the acquired input signals are all in an ON state, all in an OFF state, or in an inconsistent state between the sensors;
a third step of storing a first state into a first storage unit if a determination result of the second step indicates an inconsistent state, the first storage unit being configured to store either one of the first state and a second state;
a fourth step of storing the second state into the first storage unit if the determination result of the second step indicates all being in an OFF state; and a fifth step of determining that at least one of the plurality of sensors is failed when the first storage unit contains the first state and determining that none of the plurality of sensor is failed when the first storage unit contains the second state if the determination result of the second step indicates all being in an ON state.

10. A fault detection method by which a safety apparatus that enables/disables an operation of equipment based on input signals from a plurality of sensors each detecting a safety state of the equipment detects a fault of the plurality of sensors, the fault detection method comprising:

a first step of acquiring the input signals from the plurality of sensors;

a second step of determining whether the acquired input signals are all in an ON state, all in an OFF state, or in an inconsistent state between the sensors;

a third step of storing a first state into a first storage unit and storing a third state into a second storage unit if a determination result of the second step indicates all being in an OFF state, the first storage unit being configured to store either one of the first state and a second state, the second storage unit being configured to store either one of the third state and a fourth state;

a fourth step of storing the second state into the first storage unit when the second storage unit contains the fourth state if the determination result of the second step indicates an inconsistent state; and a fifth step of storing the fourth state into the second storage unit when the first storage unit contains the first state and determining that at least one of the plurality of sensor is failed when the first storage unit contains the second state if the determination result of the second step indicates all being in an ON state.

* * * * *